(12) United States Patent
Gretscher

(10) Patent No.: US 12,151,426 B2
(45) Date of Patent: Nov. 26, 2024

(54) TECHNIQUE FOR DYNAMIC LENGTH COMPENSATION

(71) Applicant: Phoenix Contact GmbH & Co. KG, Blomberg (DE)

(72) Inventor: Juergen Gretscher, Dornhan (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 18/699,624

(22) PCT Filed: Oct. 7, 2022

(86) PCT No.: PCT/EP2022/077918
§ 371 (c)(1),
(2) Date: Apr. 9, 2024

(87) PCT Pub. No.: WO2023/061867
PCT Pub. Date: Apr. 20, 2023

(65) Prior Publication Data
US 2024/0326317 A1 Oct. 3, 2024

(30) Foreign Application Priority Data
Oct. 11, 2021 (BE) .................................. 2021/5790

(51) Int. Cl.
*B29C 59/02* (2006.01)
*B29C 59/00* (2006.01)

(52) U.S. Cl.
CPC .......... *B29C 59/022* (2013.01); *B29C 59/002* (2013.01)

(58) Field of Classification Search
CPC .................................................. B29C 59/022
See application file for complete search history.

(56) References Cited

U.S. PATENT DOCUMENTS

| | | | | |
|---|---|---|---|---|
| 4,407,879 A | * | 10/1983 | Smart | C08J 5/18 428/141 |
| 5,109,767 A | * | 5/1992 | Nyfeler | B29C 59/04 101/23 |
| 6,418,825 B1 | | 7/2002 | Hartmann | |

(Continued)

FOREIGN PATENT DOCUMENTS

| | | | |
|---|---|---|---|
| CN | 113752569 | * | 12/2021 |
| DE | 19748789 A1 | | 5/1999 |

(Continued)

*Primary Examiner* — Edmund H Lee
(74) *Attorney, Agent, or Firm* — LEYDIG, VOIT & MAYER, LTD.

(57) ABSTRACT

A device for dynamic length compensation when embossing a film strip includes: an embossing point; a roller for slip-free transport of the film strip; and a guide channel arranged between the embossing point and the roller. The guide channel has a guide surface movable between a first position and a second position. A path length of the film strip between the roller and the embossing point in the first position of the guide surface is greater than a path length of the film strip between the roller and the embossing point in the second position. The film strip, in the first position of the guide surface in the guide channel, is conveyed from the roller to the embossing point. The guide surface is moved from the first position to the second position during the embossing of the film strip.

16 Claims, 8 Drawing Sheets

(56) References Cited

U.S. PATENT DOCUMENTS

| | | | |
|---|---|---|---|
| 8,231,372 B2* | 7/2012 | Minoura | B29C 31/08 425/112 |
| 8,647,097 B2* | 2/2014 | Minoura | B29C 31/08 425/112 |
| 2004/0150135 A1* | 8/2004 | Hennessey | B29C 59/022 264/293 |
| 2009/0315212 A1* | 12/2009 | Minoura | B29C 37/0007 425/112 |
| 2014/0346713 A1* | 11/2014 | Wada | B29C 59/022 264/496 |
| 2019/0202162 A1 | 7/2019 | Hanauer et al. | |

FOREIGN PATENT DOCUMENTS

| | | | |
|---|---|---|---|
| WO | WO136181 | * | 5/2001 |
| WO | WO 2009143644 A1 | | 12/2009 |

* cited by examiner

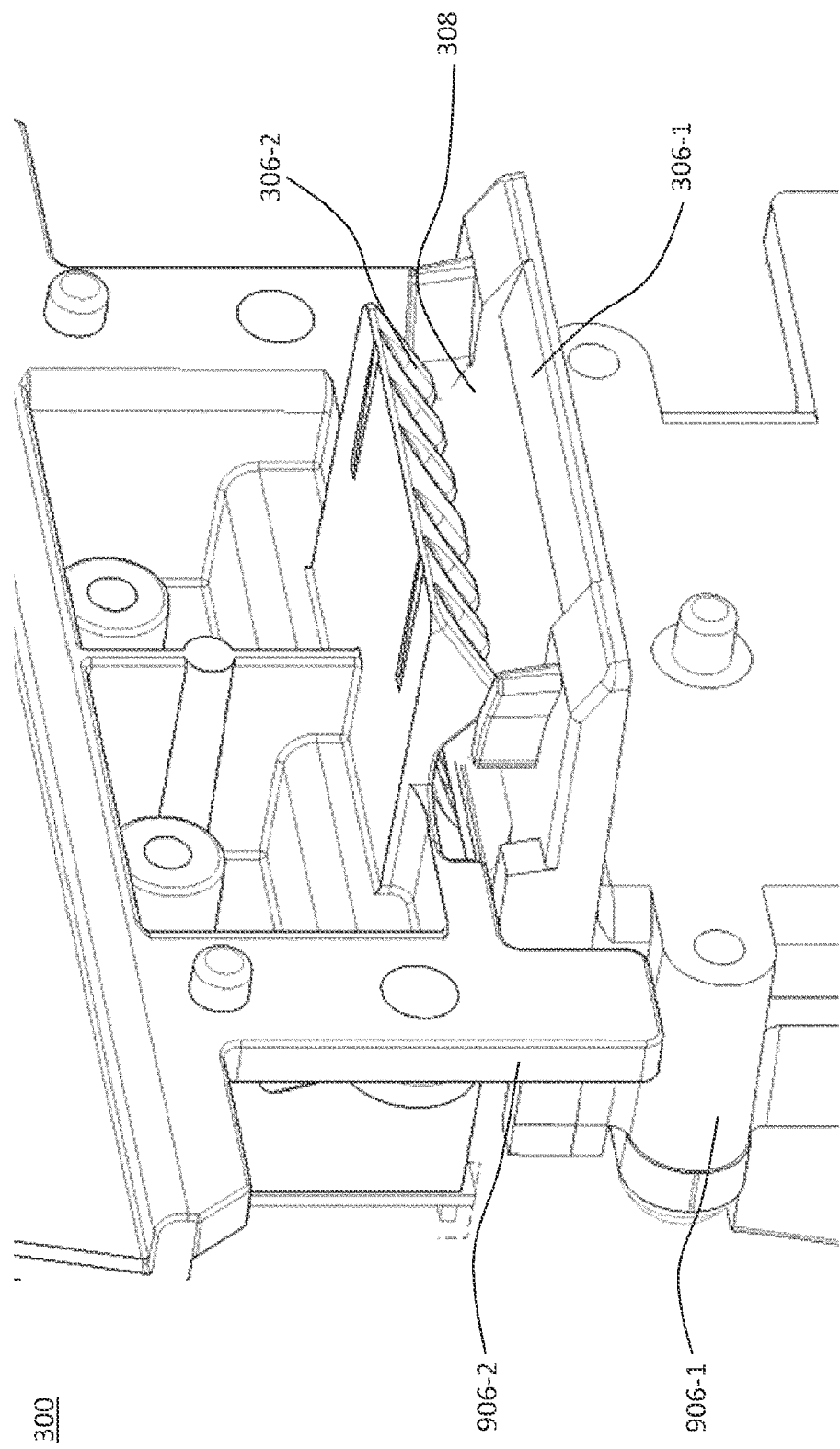

TECHNIQUE FOR DYNAMIC LENGTH COMPENSATION

CROSS-REFERENCE TO PRIOR APPLICATIONS

This application is a U.S. National Phase application under 35 U.S.C. § 371 of International Application No. PCT/EP2022/077918, filed on Oct. 7, 2022, and claims benefit to Belgian Patent Application No. BE 2021/5790, filed on Oct. 11, 2021. The International Application was published in German on Apr. 20, 2023 as WO2023/061867 under PCT Article 21(2).

FIELD

The invention relates to a technique for dynamic length compensation during embossing of a film strip.

BACKGROUND

Traditionally, film strips (also: film pieces, for short: films) are used for marking elongated objects, in particular conductors (also: cables). A film strip is wound (also: applied) around the elongated object, and the free ends are welded. For winding (also: wrapping) around the elongated object, the film strip is embossed at two predetermined length portions. For example, the distance between the two predetermined length portions can correspond to at least one circumference of the elongated object.

In FIG. 1, the film strip 10 is inserted into a conventional straight and rigid guide channel 16 with opposite rigid sides 16-1 and 16-2. For embossing, the film strip 10 is pressed and embossed by an embossing point 14 with an embossing die 14-1, in particular with a sharp-edged embossing blade 14-3, on one rigid side 16-1 of the guide channel in a flexible embossing pad (for example a rubber pad) 14-2, which is arranged on the opposite rigid side 16-2. As shown in FIG. 2, the film strip 10 is pulled and/or lengthened by pressing. Conventionally, the film strip 10 cannot compensate for the tensile force (produced for example by the embossing blade 14-3), since it is fixed at one end firmly under a pressure roller 12 and cannot yield. This results in mechanical stresses in the entire device, which is used to emboss the film strip 10 and mark the elongated object. Furthermore, neither the positions of the embossed edges of the film strip 10 nor the lengths of the markings (also: signs or tabs) conventionally correspond to a predetermined dimension for the wrapping since the film strip 10 is pulled away in an uncontrolled manner under the pressure roller 12 or the embossing pad 14-2.

SUMMARY

In an embodiment, the present invention provides a device for dynamic length compensation when embossing a film strip, comprising: an embossing point; a roller designed for slip-free transport of the film strip; and a guide channel arranged between the embossing point and the roller, wherein the guide channel comprises a guide surface movable between a first position and a second position, wherein a path length of the film strip between the roller and the embossing point in the first position of the guide surface is greater than a path length of the film strip between the roller and the embossing point in the second position, wherein the film strip, in the first position of the guide surface in the guide channel, is conveyed from the roller to the embossing point, and wherein the guide surface is moved from the first position to the second position during the embossing of the film strip.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 9 shows another schematic exemplary embodiment of a device for dynamic length compensation when embossing a film strip in which a movable guide surface comprises a spring.

DETAILED DESCRIPTION

Figure 1:
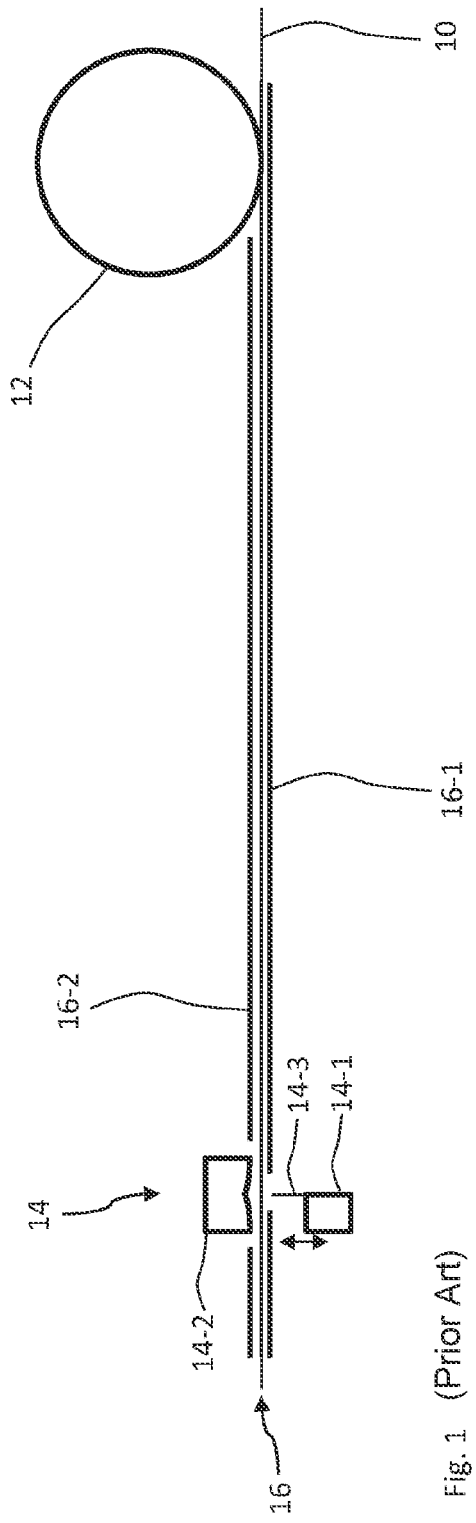
FIG. 1 shows a schematic view of a comparative example of a conventional device for embossing a film strip in a first position of an embossing die, in which the embossing die is arranged outside a static guide channel of the device.
Figure 2:
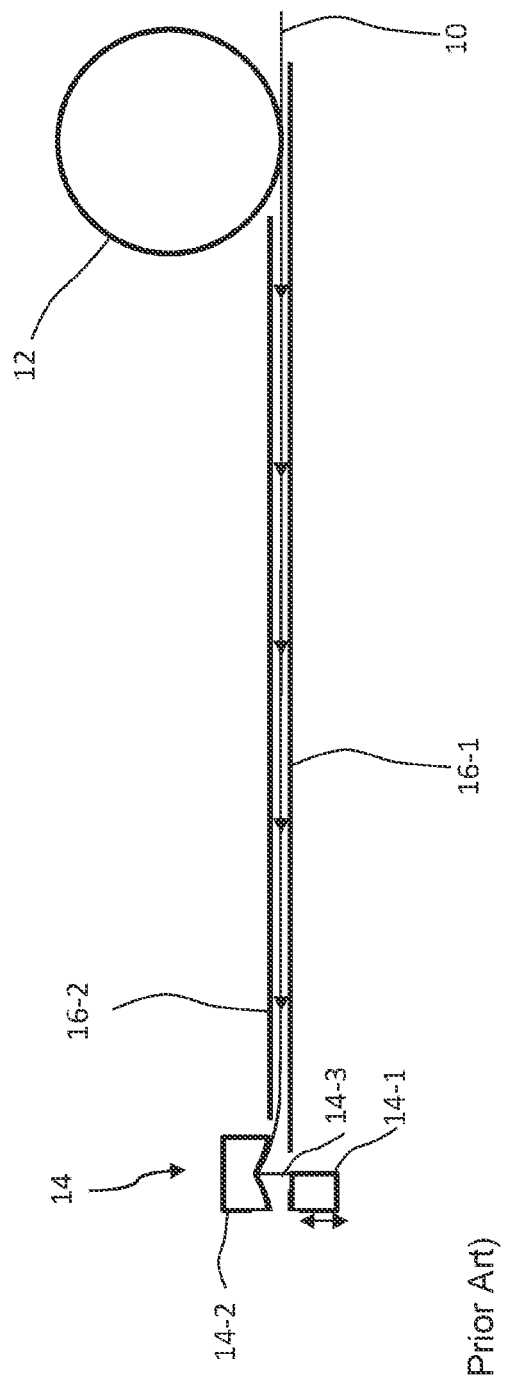
FIG. 2 schematically shows the comparative example of the conventional device for embossing the film strip in a second position of the embossing die in which the embossing die projects into the guide channel of the device, and the film strip moves or stretches to the left.

In an embodiment, the present invention provides a technique for dynamic length compensation during the embossing of a film strip.

Exemplary embodiments of the invention are described below with partial reference to the figures.

According to a first aspect, a device for dynamic length compensation during embossing of a film strip comprises an embossing point, a roller (for example a pressure roller and/or a transport roller) designed for slip-free transport of the film strip, and a guide channel arranged between the embossing point and the roller. The guide channel comprises a guide surface movable between a first position and a second position. A path length of the film strip between the roller and the embossing point in the first position of the guide surface is greater than a path length of the film strip between the roller and the embossing point in the second position. The film strip, in the first position of the guide surface in the guide channel, is conveyed from the roller to the embossing point. The guide surface is moved from the first position to the second position during the embossing of the film strip.

The roller designed for slip-free transport of the film strip can comprise a pressure roller and/or a transport roller. Alternatively or additionally, slip-free transport can be achieved by a (for example rough) surface structure and/or a pressure exerted on the film strip by the roller, in particular approximately perpendicular to a longitudinal direction of the guide channel.

The guide channel can also be referred to as a media path.

The guide surface can also be referred to as a movable deflection element.

The guide surface can be movable between the first position and the second position within the guide channel, preferably transversely to a course of the film strip determined by the guide channel.

As a result of the movement of the guide surface, a movement of the film strip, in particular a stretching of the film strip, can be compensated for during the embossing. Alternatively or additionally, damage to the film strip during embossing due to tensile forces can be prevented and/or minimized. The tensile forces can, for example, be exerted on the film strip by the embossing point, in particular an embossing die and/or embossing blade.

Embossing the film strip can facilitate and/or improve the application of a marking on an elongated object.

The application of the film strip can comprise a circumferentially closed arrangement of the film strip around the elongated object (for example around a longitudinal axis of the elongated object in the longitudinal direction). The device can comprise a mechanism for attaching the film strip to the elongated object. For example, a mechanism for attaching the film strip in a conveying direction of the film strip (i.e. a direction from the roller to the embossing point) can be arranged after the embossing point.

The film strip can comprise a labeled and/or printed portion which, after the film strip has been attached to the elongated object, projects as a tab from the elongated object and/or is readable in one plane. For example, adhesive bonding (for example by plastics welding, in particular by means of ultrasound or heating) of two opposite ends of the film strip can be facilitated by the embossing and/or an improved reading of the printed (for example labeled) portion can be achieved.

Alternatively or additionally, the embossing can provide improved molding of the film strip to the elongated object with bending points defined by the embossing for bonding. Alternatively or additionally, an improved stability of a tab portion of the film strip can be achieved by the embossing.

Alternatively or additionally, due to the embossing, the printed (for example labeled) portion of the film strip, can be tangent to the elongated object, and/or be substantially flat, and/or have a radius of curvature that is (preferably many times) larger than the elongated object.

The guide surface can be biased to move from the first position and to the second position, for example by means of a spring.

The guide surface can comprise a spring. For example, the guide surface can be biased on or about an axis of rotation (for example comprising a hinge) by a spring (for example a leaf spring, or a torsion spring, or a gas pressure spring).

Alternatively or additionally, the guide surface can comprise a deformable (also: flexible) material and/or shape memory material. A rest position of the deformable material and/or the shape memory of the guide surface can comprise the first position and/or correspond to the first position. The deformable material and/or shape memory material can be fastened to a rigid portion of the guide channel (for example rigidly) by one end of the guide surface.

A tensile stress of the film strip can be limited by the bias of the movable guide surface. The limited tensile stress can be smaller than a holding torque of the roller (corresponding for example to the radius of the roller). As a result, a rotation of the roller due to the embossing process or a sliding of the film strip over the roller due to the embossing operation can be prevented.

In the first position and/or in the second position (for example at least in portions), the film strip can rest against the guide surface for the curvilinear guidance of the film strip in the guide channel. Alternatively or additionally, the film strip can be guided in the first position and/or in the second position in a curvilinear manner in the guide channel.

A (for example maximum) curvature of the course of the film strip determined by the guide channel along the path length can be greater in the first position than in the second position.

The guide surface can have a rotatably mounted roller via which the film strip can be guided, preferably in a slip-free manner. Friction of the film strip can thereby be minimized.

The guide surface can be convex on a side facing the film strip.

A radius of curvature of the convex guide surface can correspond (for example in portions) to the curvilinear guide.

A radius of curvature of the convex guide surface can be smaller than the path length of the film strip guided in the guide channel. A small transmission ratio between the bias of the guide surface and the limited tensile stress of the film strip can thereby be achieved. The bias of the guide surface can correspond to a normal force which the guide surface transmits to the film strip perpendicular the guide surface. The transmission ratio between the normal force of the guide surface and the limited tensile stress of the film strip can be less than three to one (3:1) or two to one (2:1).

A radius of curvature of the convex guide surface can often be greater than a thickness (i.e. strength) of the film strip.

Preferably, the film strip does not slide over an edge (for example a bending edge or cutting edge) of the guide surface. Damage to the film strip (for example a detachment of a surface coating and/or a marking of the film strip) can thereby be prevented.

A radius of curvature of the convex guide surface can, in particular in the first position, be greater than a width of the guide channel. Alternatively or additionally, the width of the guide channel and/or the guide surface can be greater than a width of the film strip (provided for example for embossing).

The width can be the width of a portion of the guide channel that faces away from the guide surface. A transportation jamming of the film strip in the guide channel can thereby be prevented.

The film strip can rest against the guide surface (for example at least in portions) both in the first position and in the second position.

The guide surface can be arranged in the first position and in the second position within the guide channel. The tensile force can thereby be limited by the bias in the entire region between the first position and the second position. In other words, the film strip never runs, or only in the second position of the guide surface, in one plane. For example, in the first position, and optionally in the second position, the guide surface deflects the film strip out of a plane. The plane can be determined by the portions of the guide channel in the roller and in the embossing point.

The guide surface can be pivotable between the first position and the second position. For example, an axis of rotation (also: pivot axis, for example comprising a hinge or a bearing) of the pivoting movement can be arranged perpendicular to the film strip and/or perpendicular to the course of the film strip (i.e. the conveying direction) determined by the guide channel.

A pivot point of the pivoting movement can be arranged outside the guide channel.

The embossing point can comprise an embossing die movable transversely to the guide channel and an embossing pad arranged in the transverse movement of the embossing die. The guide channel can open at the embossing point between the embossing die and the embossing pad.

The transverse movement of the embossing die into the embossing pad can shorten the path length of the film strip in the guide channel, for example against a bias of the guide surface.

During the embossing, the guide surface and the embossing die can move in the same direction with respect to a transverse direction of the guide channel. The transverse direction can be perpendicular to the conveying direction (i.e. the course of the conveying channel) and/or perpendicular to the axis of rotation (i.e. pivot axis) of the guide surface.

The movement of the guide surface during the embossing can comprise a movement from the first position and to the second position. As a result, friction on stationary surfaces of the guide channel between the guide surface and the embossing point can be reduced.

Alternatively or additionally, the guide surface and the embossing die can move in the opposite direction with respect to the transverse direction of the guide channel during the embossing. A first side of the guide channel can thereby comprise a drive of the embossing die and/or the axis of rotation of the guide surface, and/or a second side of the guide channel opposite the first side in the transverse direction can be particularly compact and/or simple.

Alternatively or additionally, the guide surface and the embossing die can move in the same direction with respect to the transverse direction of the guide channel during the embossing. As a result, the film strip placed under tensile stress (short: tension) during the embossing can slide over the guide surface with particularly low friction.

Alternatively or additionally, the force of gravity can contribute to tension of the film strip, in particular along the guide surface.

The embossing die can be or comprise an embossing blade. The embossing blade can preferably be perpendicular to the guide channel. Alternatively or additionally, the embossing die can comprise a (for example pointed) edge for embossing.

According to a second aspect, a method for dynamic length compensation is provided during the embossing of a film strip. The method comprises a step of conveying the film strip in a guide channel arranged between a roller (for example a pressure roller and/or a transport roller), which is designed for slip-free transport of the film strip, and a guide channel which is arranged at an embossing point. The film strip is conveyed in a direction from the roller to the embossing point. The guide channel comprises a guide surface movable between a first position and a second position. When the film strip is conveyed, the guide surface comprises the first position, and/or the guide surface assumes the first position. The method further comprises a step of embossing the film strip by means of the embossing point. During embossing, the guide surface is moved to the second position (for example due to an increasing tensile stress of the film strip). A path length of the film strip between the roller and the embossing point in the first position of the guide surface is greater than a path length of the film strip between the roller and the embossing point in the second position.

The method of the second aspect can be carried out by means of the device of the first aspect.

Figure 3:
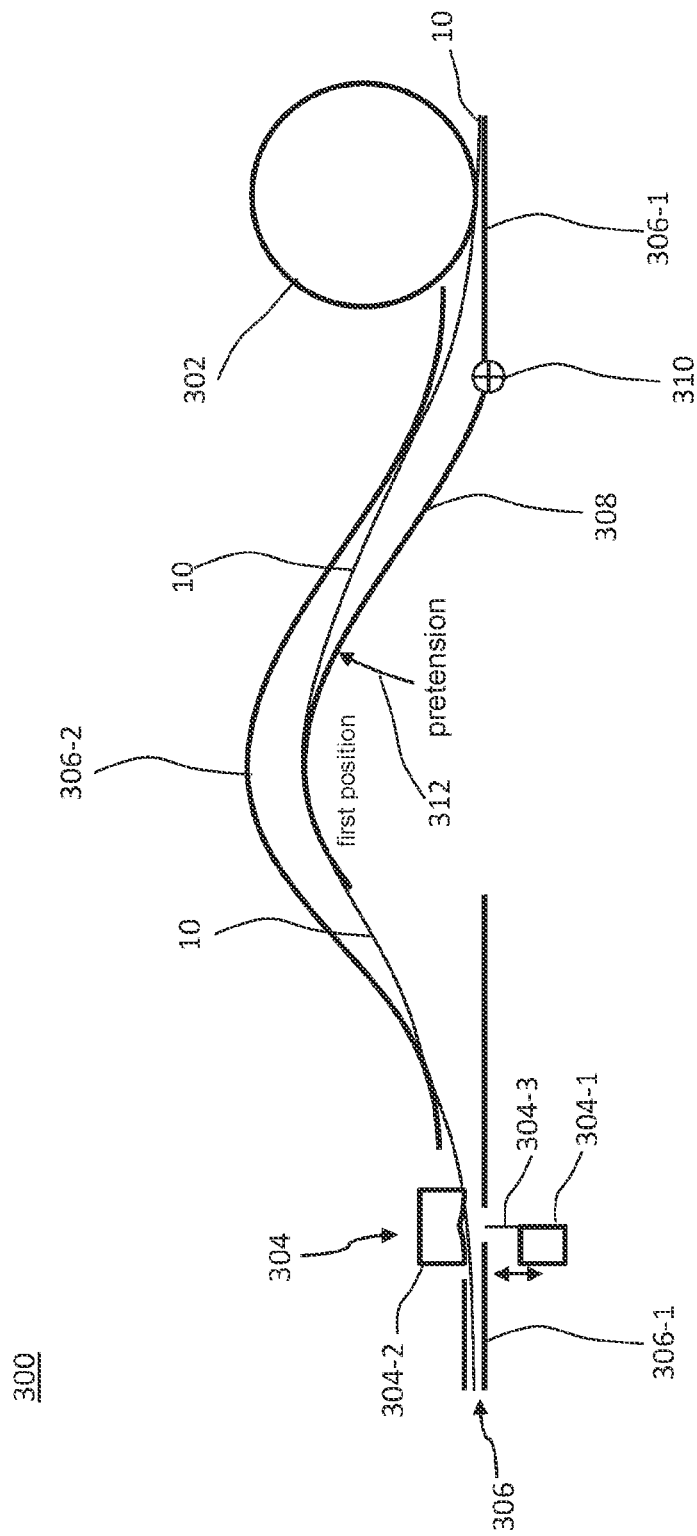
FIG. 3 schematically shows a first exemplary embodiment of a device for dynamic length compensation during the embossing of a film strip in a first position of a guide surface, while an embossing die is arranged outside a guide channel.

FIG. 3 schematically shows a first exemplary embodiment of a device 300 for dynamic length compensation according to the invention when embossing a film strip 10.

The device of FIG. 3 comprises a pressure roller 302, an embossing point 304, and a guide channel 306 that is arranged between the pressure roller 302 and the embossing point 304 and in which the film strip 10 is guided.

The embossing point 304 of the first exemplary embodiment comprises an embossing die 304-1 with an embossing blade 304-3 and an embossing pad 304-2. The embossing die 304-1 and the embossing pad 304-2 are arranged on opposite sides 306-1, 306-2 of the guide channel 306.

The guide channel 306 comprises a first side 306-1 on which the embossing die 304-1 is arranged, and a side 306-2 opposite the first side 306-1 on which the embossing pad 304-2 is arranged.

In the first exemplary embodiment of FIG. 3, a movable guide surface (also: flexible deflection element) 308 is arranged on the first side 306-1 and/or forms a part of a side wall of the first side 306-1 of the guide channel 306. In the first exemplary embodiment of FIG. 3, the guide surface 308 is rotatably mounted on a rigid part of the first side 306-1 of the guide channel 306 by means of a spring-loaded hinge 310 and is acted upon with a bias 312. The bias 312 holds the movable guide surface 308 in a rest position (for example without tensile forces acting on the film strip 10) in the first position shown in FIG. 3. The second side 306-2 of the guide channel 306 is rigid in the first exemplary embodiment of FIG. 3.

Figure 4:
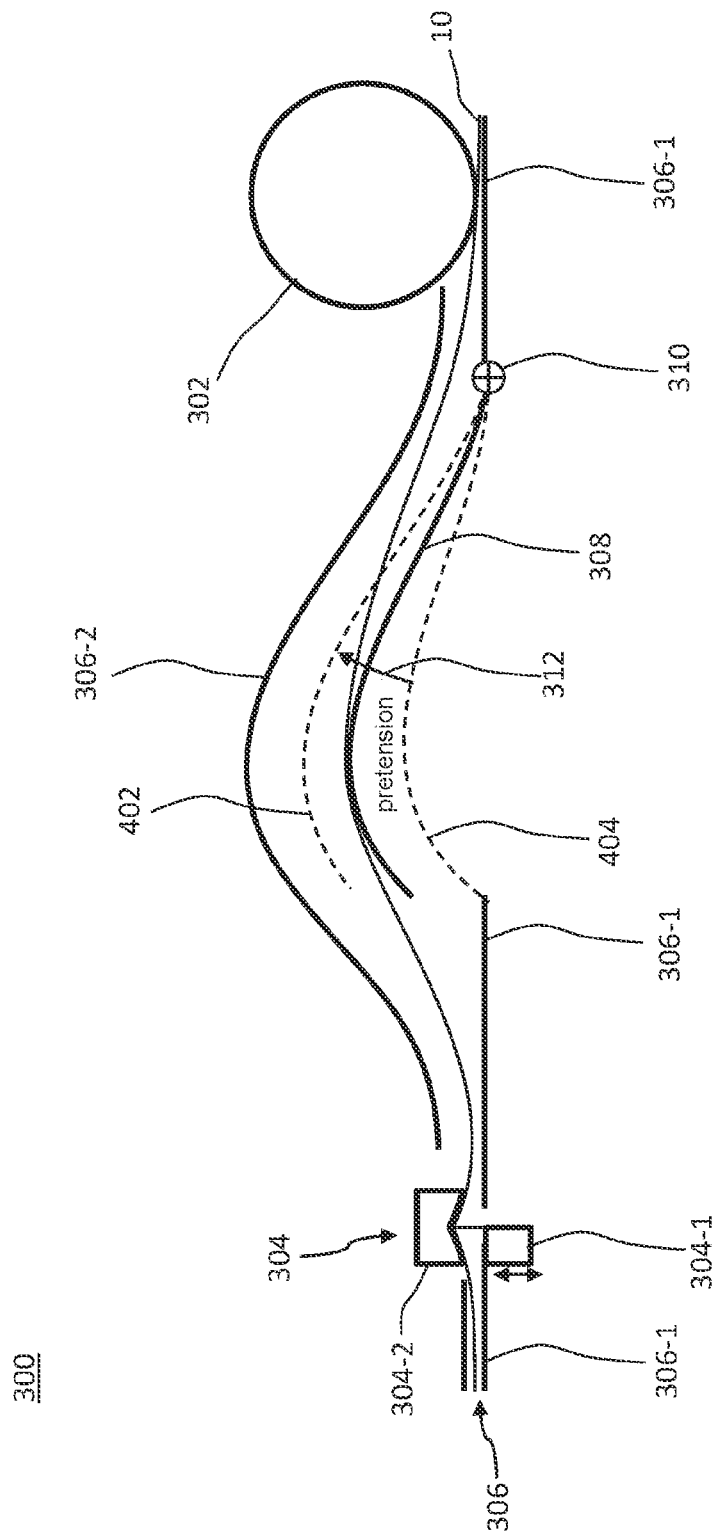
FIG. 4 schematically shows the first exemplary embodiment of the device for dynamic length compensation during the embossing of the film strip in a second position of the guide surface, while the embossing die projects into the guide channel and exerts a tensile force on the film strip.

FIG. 4 schematically shows the device 300 of the first exemplary embodiment with the movable guide surface 308 in a second position. The second position is located between the first position 402 and a stop position 404 in which the guide surface 308 abuts the rigid part of the first side 306-1 by its free end facing away from the hinge 310. Alternatively, the second position can correspond to the stop position 404.

As shown in FIG. 4, the movable guide surface 308 assumes the second position when the embossing die 304-1 presses the film strip 10 into the embossing pad 304-2.

In the first exemplary embodiment of FIGS. 3 and 4, the movable guide surface 308 is brought to the second position in the direction opposite a movement of the embossing die 304-1 (in particular against the bias 312) during the embossing.

Figure 5:
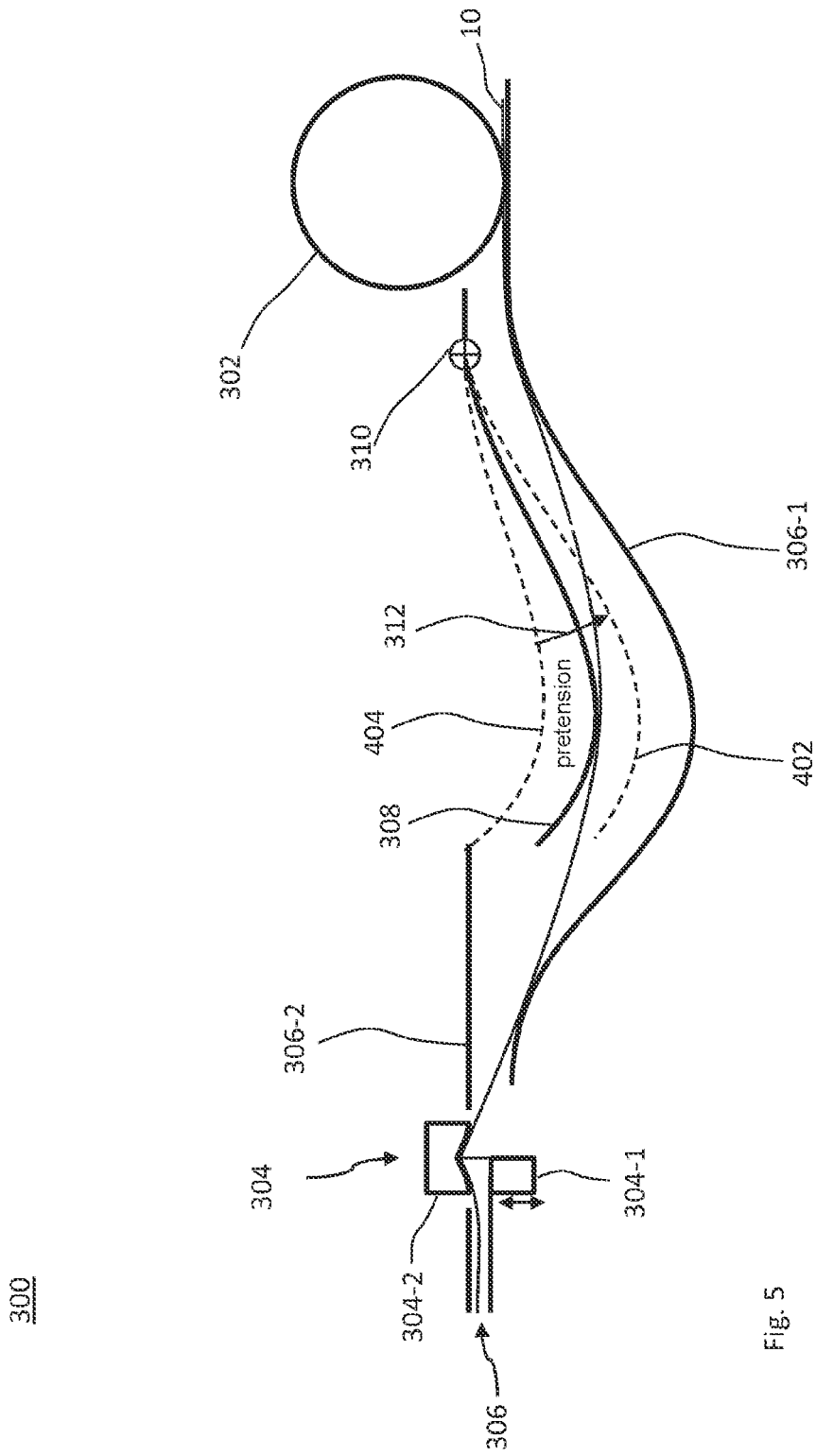
FIG. 5 schematically shows a second exemplary embodiment of a device for dynamic length compensation during the embossing of a film strip in a second position of the guide surface, while an embossing die projects into the guide channel and exerts a tensile force on the film strip.

FIG. 5 schematically shows a second exemplary embodiment of a device 300 for dynamic length compensation according to the invention during the embossing of a film strip 10.

Identical parts of the device 300 in all exemplary embodiments are denoted by the same reference signs.

In the second exemplary embodiment of FIG. 5, the movable guide surface 308 is rotatably mounted on a rigid part of the second side 306-2 of the guide channel 306 by means of a spring-loaded hinge 310. In the second exemplary embodiment of FIG. 5, the first side 306-1 of the guide channel 306 is rigid.

In the second exemplary embodiment of FIG. 5, the movable guide surface 308 is brought to the second position in the same direction as a movement of the embossing die 304-1 (in particular against the bias 312) during the embossing.

In a third exemplary embodiment, the movable guide surface 308 comprises a flexible (e. g., shape memory) material which is arranged rigidly at one end (for example, instead of by means of a hinge 310) on a rigid part of the first side 306-1 or the second side 306-2 of the guide channel 306. In the third exemplary embodiment, the rest position of the flexible material and/or the shape memory biases the movable guide surface 308 in the first position 402, and in the second position 602, the flexible (e. g., shape memory) material of the movable guide surface 308 is deformed from its rest position, as shown schematically in FIG. 6.

As can be seen from the above exemplary embodiments, by introducing the movable guide surface 308 (also: the flexible deflection element) into the guide channel 306 (also: media path, short: path), a tensile force and/or pulling movement of the embossing point 304 onto the film strip 10 can be compensated for during the embossing.

By means of the bias 312 of the movable guide surface 308, the film strip 10 (which is deflected by a flat surface, for example) can reproducibly follow the same path, so that an absolute value of a length of the film strip 10 (also: sign length), in particular of a portion for wrapping an elongated object and/or a tab portion for the application (for example printing) of a marking, does not fluctuate beyond a tolerance range. The tolerance range can, for example, comprise a change in length of the film strip 10 of at most one tenth of a millimeter (0.1 mm).

By means of a shape of the movable guide surface 308 and/or the bias 312 of the movable guide surface 308, disturbances, for example film jams, of the deflection of the film strip 10 can be prevented.

A service life of a spring element, for example arranged on the hinge 308 of the first and/or second exemplary embodiment, and/or a service life of a deformable material (e. g., shape memory) material, for example according to the third exemplary embodiment, can be selected in accordance with a planned cycle number, for example a number of embossing processes and/or a number of markings of the elongated object by means of the film strip 10.

Figure 6:
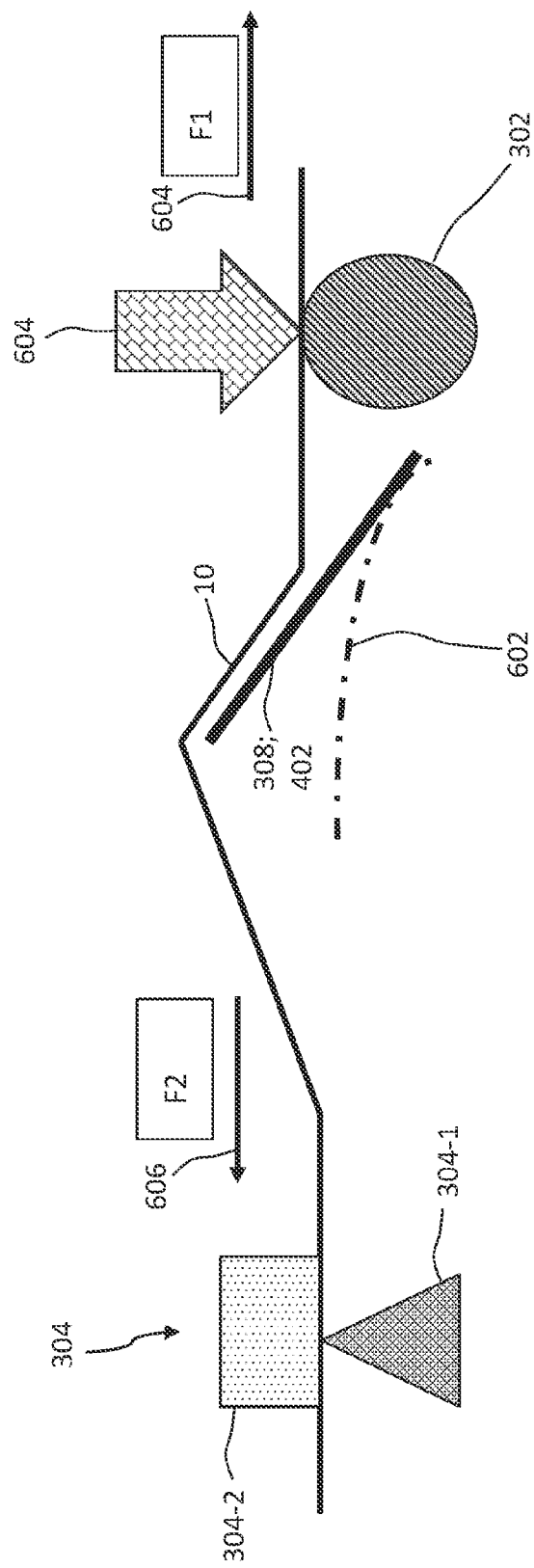
FIG. 6 schematically shows a guide surface comprising a deformable (e. g., shape memory) material and tensile forces acting on a film strip.

FIG. 6 schematically shows a movable guide surface (also: flexible element) 308 which can be designed, for example, as a shape memory material and deforms or moves from the first position 402 to the second position 602 under a force exerted by the film strip 10.

The movable guide surface 308 can be rigid enough to guide the film strip 10 (also: the medium to be deflected). However, the movable guide surface 308 should not be stronger (for example no stronger tensile force on the film strip 10) than permitted by a strength of the film strip 10, or than a clamping force that holds the film strip 10 in position (for example a clamping force of the pressure roller 302). Otherwise, the film strip 10 can slide, in particular via the movable guide surface 308. A desired effect, in particular dynamic length compensation, can thereby be lost.

FIG. 6 schematically shows a pressing force (for example comprising a friction of the film strip 10 on the pressure roller 302) 604 which effectively exerts a holding force F1 on the film strip 10 guided by the pressure roller 302 in the direction of the embossing point 304. A size of the pressing force and/or the friction can be determined by a coefficient of friction of the pressure roller 302 and/or a coefficient of friction of the film strip 10.

A rigidity of the movable guide surface 308 and/or an angle (for example in the first position 402 and/or the second position 602) of the movable guide surface 308 can produce (also: generate) a required tensile force in order to deflect and/or deform the movable guide surface 308.

A tensile force F2, as shown schematically at the reference sign 606, can be (in particular much) smaller than the holding force F1 at reference sign 604:

F2<F1 (in particular F2<<F1).

In the exemplary embodiment in FIG. 6, the embossing die 304-1 comprises a wedge-shaped end which presses the film strip 10 into the embossing die 304-2 and/or can emboss the film strip 10. Alternatively or additionally, a wedge-shaped end of the embossing die 304-1 can also be referred to as an embossing blade.

Figure 7:
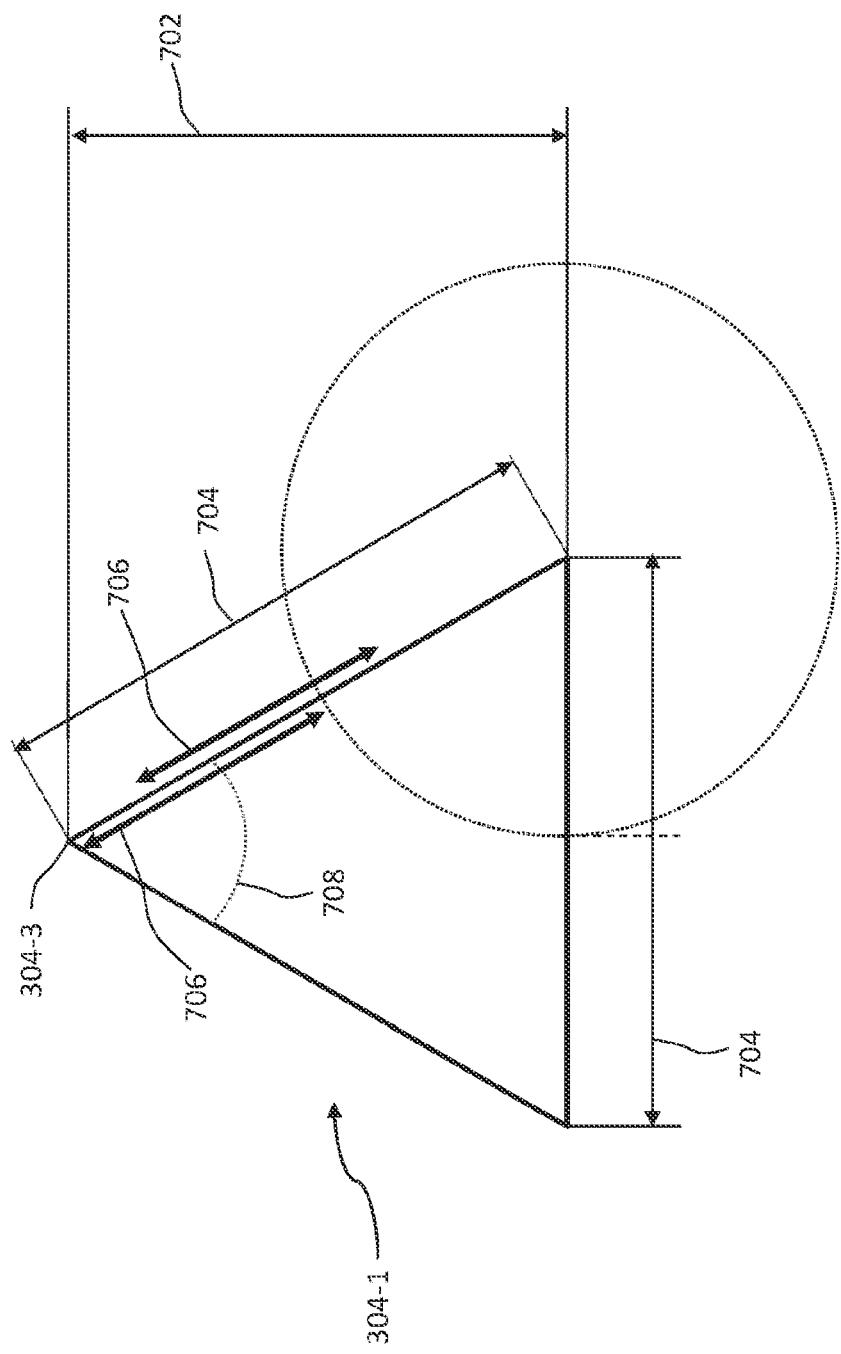
FIG. 7 schematically shows a wedge-shaped tip of an embossing die and a feed path of a film strip depending on a penetration depth of the embossing die into the embossing pad.

FIG. 7 shows an example of a wedge-shaped end 304-1 of an embossing die 304-1. In the exemplary embodiment, the wedge shape comprises an angle 708 of 60 degrees. Alternatively or additionally, a cross section of an embossing blade 304-3 comprises an equilateral triangle.

In the exemplary embodiment of FIG. 7, the wedge-shaped end 304-1 comprises a height 702 which can correspond (for example, approximately) to a penetration depth of the embossing die 304-1 into the embossing pad. For example, (e.g., ordinary or proper) embossing can comprise a penetration depth of one to two millimeters (in particular approximately 1.5 mm) of the embossing die 304-1 (for example the embossing blade 304-3) into the embossing pad 304-2.

Given an equiangular triangle, the height 702 is $\sqrt{3}/2$ times the side length 704. In the example of a height of 1.5 mm, the side length approximately corresponds to 1.73 mm, and half the side length 706 approximately corresponds to 0.87 mm.

From the penetration depth of the embossing die 304-1, an additional feed path results (which can also be referred to as "delta") of the film strip approximately corresponding to half the side length 706, for example 0.87 mm of additional feed path. The additional feed path can refer to a change in the length of the film strip 10 between the wedge-shaped end and/or the embossing blade 304-3 at one end of the guide channel 306, and a pressure roller at the other end of the guide channel, as shown by way of example at reference signs 706 in FIG. 7.

Preferably, the guide channel 306 is longer in the first position 402 of the guide surface 308 than in the second position 602 of the guide surface 308 by the feed path, for example half the side length 706.

The first position 402 of the guide surface 308 can also be described as forming a baffle.

A change in the length of the guide channel 308 from the first position 402 to the second position 602 can be dependent on a depth of the embossing and/or correspond to the depth of the embossing.

The dynamic length compensation, for example with a predetermined tolerance range and/or a deviation of a length of the film strip 10 by less than one millimeter (in particular in the range of 1/10 mm or lower), in the embossing can be achieved by moving the movable guide surface 308 from the first position 402 to the second position 602. For example, the length compensation can be made possible by selecting a length of an (in particular rigid) guide surface 308 about an axis of rotation (for example determined by a hinge 310) and/or by selecting an elasticity of a material (for example shape memory).

The guide surface 308 can comprise polyester (e. g., Hostaphan) and/or a spring steel sheet as a material.

The film strip 10 can comprise a plastics strip for welding, a self-adhesive strip, a carrier for adhesive labels and/or garden labels. Alternatively or additionally, the film strip 10 can comprise a heat-sealing film (for example a laminate made of polyester and/or hot-melt adhesive) as the material.

The film strip 10 can comprise a thickness of less than one tenth of a millimeter, for example 0.03 mm. Alternatively or additionally, a width of the film strip 10 can comprise between a few millimeters and a quarter or a half centimeter, for example a width can comprise between 15 mm and 23 mm.

A spring, a spring constant, a lever arm, a length and/or an elasticity (in particular of a shape memory material) of the movable guide surface 308 (for example in the conveying direction) can be selected in a suitable size ratio to an extensibility of the film strip 10 in order to achieve dynamic length compensation with a predetermined maximum deviation (for example a maximum displacement and/or maximum elongation of the film strip 10). The deviation can be, for example, in the range between a plurality of micrometers and a millimeter, in particular 0.1 mm.

Figure 8:
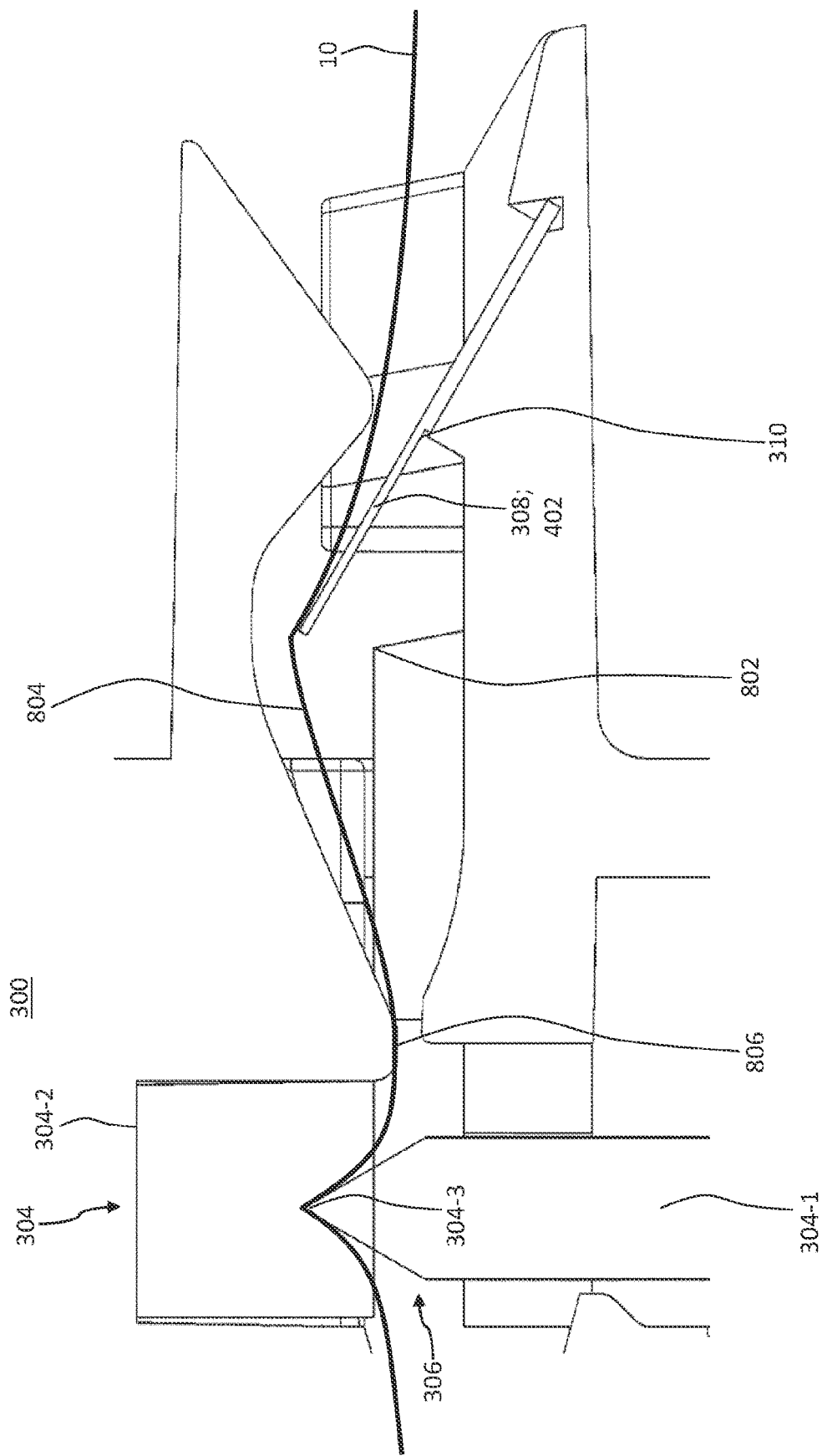
FIG. 8 shows another schematic exemplary embodiment of a device for dynamic length compensation when embossing a film strip in which a movable guide surface comprises a lever arm.

FIG. 8 shows another exemplary embodiment of a device 300 with an embossing die 304-1 according to FIG. 7. The exemplary embodiment of FIG. 8 comprises a guide surface 308 designed as a straight lever arm. As in FIG. 8, a length of the lever arm can comprise 4.15 mm. The film strip 10 can be deflected at a deflection point 806 between the movable guide surface 308 and the embossing point 305 in the guide channel 306. In the example of FIG. 8, a free path length of the film strip 10 in the first position (reference sign 402) can comprise 8.66 mm. Alternatively or additionally, a deflection of the film strip 10 from a flat guide channel in the first position 402 of the guide surface 308 can comprise a total of 4.15 mm+8.66 mm=12.81 mm.

A path length of the film strip 10 in the second position 602 of the guide surface 308 can comprise approximately 12.01 mm from the axis of rotation (for example a hinge) 310 up to the deflection point 802. Alternatively or additionally, the change in the path length of the film strip 10 in the guide channel 306 can comprise, for example, 0.80 mm from the first position 402 to the second position 602.

FIG. 9 shows another exemplary embodiment of a device 300 with a deformable (for example shape-memory) material, in particular a spring, as a movable guide surface 308. In the shown exemplary embodiment, the lower half 906-1 of the device is, for example, facing the embossing die and comprises the side 306-1 of the guide channel. In the shown exemplary embodiment, the upper half 906-2 of the device is, for example, facing the embossing pad and comprises the side 306-2 of the guide channel. Alternatively or additionally, the upper half of the device can face the embossing die and comprise the side 306-1 of the guide channel. The lower half of the device can face the embossing pad which comprises the side 306-2 of the guide channel. Alternatively or additionally, the guide surface 308 can be arranged in a first exemplary embodiment, for example as shown in FIG. 9, on the lower half of the device 300 and in a second exemplary embodiment on the upper half of the device 300.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Film strip 10
Pressure roller 12
Embossing point 14
Embossing die 14-1
Embossing pad 14-2
Conventional rigid guide channel 16
Side of the rigid guide channel facing the embossing die 16-1
Side of the rigid guide channel facing the embossing pad 16-2
Device 300
Roller for slip-free transport of a film strip, e. g., pressure roller 302
Embossing point 304
Embossing die 304-1
Embossing pad 304-2
Embossing blade 304-3
Guide channel 306
Side of the guide channel facing the embossing die 306-1
Side of the guide channel facing the embossing pad 306-2
Guide surface 308
Hinge 310
Bias 312
First position 402
Stop position 404
Second position 602
Holding force of the roller 604
Tensile force of the embossing point 606
Penetration depth of the embossing die 702
Width of the embossing die at the penetration depth 704
Feed length of the film strip during the embossing 706
Angle of wedge-shaped end (embossing blade) 708
Stop point of the guide surface 802
Free path length of the film strip 804
Deflection point of the film strip 806
Side of the device facing the embossing die 906-1
Side of the device facing the embossing pad 906-2

The invention claimed is:

1. A device for dynamic length compensation when embossing a film strip, comprising:
   an embossing point;
   a roller designed for slip-free transport of the film strip; and
   a guide channel arranged between the embossing point and the roller,
   wherein the guide channel comprises a guide surface movable between a first position and a second position,
   wherein a path length of the film strip between the roller and the embossing point in the first position of the guide surface is greater than a path length of the film strip between the roller and the embossing point in the second position,
   wherein the film strip, in the first position of the guide surface in the guide channel, is conveyed from the roller to the embossing point, and
   wherein the guide surface is moved from the first position to the second position during the embossing of the film strip.

2. The device claim 1, wherein the roller designed for slip-free transport of the film strip comprises a pressure roller and/or a transport roller.

3. The device of claim 1, wherein the guide surface is biased to move from the first position and to the second position.

4. The device of claim 1, wherein the film strip in the first position and/or in the second position rests against at least one portion of the guide surface for curvilinear guidance of the film strip in the guide channel.

5. The device of claim 1, wherein the guide surface has a rotatably mounted roller via which the film strip is guided, preferably in a slip-free manner.

6. The device of claim 1, wherein the guide surface is convex on a side facing the film strip.

7. The device of claim 6, wherein a radius of curvature of the convex guide surface is smaller than the path length of the film strip guided in the guide channel.

8. The device of claim 6, wherein a radius of curvature of the convex guide surface is many times greater than a thickness of the film strip.

9. The device of claim 6, wherein a radius of curvature of the convex guide surface in the first position and/or in the second position is greater than a width of the guide channel.

10. The device of claim 1, wherein the film strip rests against the guide surface both in the first position and in the second position.

11. The device of claim 1, wherein the guide surface is pivotable between the first position and the second position, and
    optionally wherein an axis of rotation of the pivoting movement is arranged perpendicular to the film strip and/or perpendicular to a course of the film strip determined by the guide channel.

12. The device of claim 1, wherein the embossing point comprises an embossing die movable transversely to the guide channel and an embossing pad arranged in the transverse movement of the embossing die, and
    wherein the guide channel opens between the embossing die and the embossing pad at the embossing point.

13. The device of claim 10, wherein a transverse movement of the embossing die into the embossing pad shortens the path length of the film strip in the guide channel, optionally against a bias of the guide surface.

14. The device of claim 12, wherein the guide surface and the embossing die move in a same direction with respect to a transverse direction of the guide channel during embossing.

15. The device of claim 12, wherein the embossing die comprises an embossing blade which is preferably perpendicular to the guide channel.

16. A method for dynamic length compensation when embossing a film strip, comprising:
    conveying the film strip in a guide channel arranged between a roller designed for slip-free transport of the film strip and an embossing point, wherein the film strip is conveyed in a direction from the roller to the embossing point, wherein the guide channel comprises a guide surface movable between a first position and a second position, and wherein the guide surface comprises the first position during conveying; and
    embossing the film strip by the embossing point, wherein the guide surface is moved to the second position during embossing, wherein a path length of the film strip between the roller and the embossing point in the first position of the guide surface is greater than a path length of the film strip between the roller and the embossing point in the second position.

* * * * *